US012783632B2

(12) United States Patent
Size et al.

(10) Patent No.: US 12,783,632 B2
(45) Date of Patent: Nov. 3, 2026

(54) COMPUTER-BASED SYSTEMS CONFIGURED TO DYNAMICALLY GENERATE A UNIQUE SCHEMA-SPECIFIC IDENTIFIER BASED ON A GENERATED API CALL

(71) Applicant: Capital One Services, LLC, McLean, VA (US)

(72) Inventors: Charlie Gene Size, Arlington, VA (US); Tara Alemzadeh, Washington, DC (US); Jackson Macomber, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 232 days.

(21) Appl. No.: 18/643,799

(22) Filed: Apr. 23, 2024

(65) Prior Publication Data

US 2025/0328628 A1 Oct. 23, 2025

(51) Int. Cl.

*G06F 21/44* (2013.01)
*G06Q 20/36* (2012.01)
*G06Q 20/38* (2012.01)

(52) U.S. Cl.

CPC ......... *G06F 21/44* (2013.01); *G06Q 20/3674* (2013.01); *G06Q 20/3827* (2013.01)

(58) Field of Classification Search

CPC . G06F 21/44; G06Q 20/3674; G06Q 20/3827
See application file for complete search history.

(56) References Cited

U.S. PATENT DOCUMENTS

| | | | |
|---|---|---|---|
| 10,380,660 B2 | | 8/2019 | Borucki |
| 11,132,693 B1 | | 9/2021 | Sahni et al. |
| 2019/0362083 A1 | * | 11/2019 | Ortiz ...................... G06N 20/00 |
| 2020/0051112 A1 | * | 2/2020 | Nelsen ............... G06Q 30/0226 |
| 2020/0274900 A1 | * | 8/2020 | Vaishnavi ............... H04L 63/20 |
| 2021/0266167 A1 | * | 8/2021 | Lohe ..................... H04L 9/3213 |
| 2024/0346087 A1 | * | 10/2024 | Quigley .................. G06F 16/22 |
| 2025/0097219 A1 | * | 3/2025 | Hari ...................... H04L 9/3231 |

* cited by examiner

*Primary Examiner* — Kristie D Shingles
(74) *Attorney, Agent, or Firm* — GREENBERG TRAURIG, LLP

(57) ABSTRACT

In some embodiments, the present disclosure provides an exemplary method that may include steps of receiving a permission from a user of a plurality of users to utilize a particular service associated with a device; identifying a predetermined plurality of authentication rules associated with a profile of the primary user; determining a plurality of parameters associated with the device at a particular time period; comparing a set of controls associated with a current utilization of the service of the device to the plurality of parameters associated with the device; generating an API call based on a comparison of the set of controls to the plurality of parameters; generating a plurality of unique schema-specific identifiers based on a generated API call associated with the set of controls established by the primary user; and generating a provision utilizing the unique schema-specific identifier to perform a particular action associated with the device.

20 Claims, 7 Drawing Sheets

COMPUTER-BASED SYSTEMS CONFIGURED TO DYNAMICALLY GENERATE A UNIQUE SCHEMA-SPECIFIC IDENTIFIER BASED ON A GENERATED API CALL

FIELD OF TECHNOLOGY

The present disclosure generally relates to computer-based systems configured to dynamically generate a virtual card number based on a generated API call.

BACKGROUND OF TECHNOLOGY

Typically, an authorized user is an individual that has been added to a credit card account by an owner of the credit card, who is also considered a primary cardholder. The authorized user can make purchases with the credit card as if it were their own. However, the responsibility to pay any charges remains with the primary cardholder. Authorized users have no legal duty to pay for charges to the credit account.

SUMMARY OF DESCRIBED SUBJECT MATTER

In some embodiments, the present disclosure provides an exemplary technically improved computer-based method that includes at least the following steps: receiving, by a processor, a permission from a user of a plurality of users to utilize a particular service associated with a device, where a primary user of the plurality users provides a permission to the device that allows other users of the plurality of user to utilize the particular service, where the particular service includes an automatic authentication of a transfer of data between an account associated with the primary user and the device; identifying, by the processor, a predetermined plurality of authentication rules associated with the account of the primary user; determining, by the processor, a plurality of parameters associated with the device at a particular time period, where the plurality of parameters include an identity of the user utilizing the service, a location of the device, and a type of action associated with the user utilizing the service; dynamically comparing, by the processor, a set of controls associated with a current utilization of the service of the device to the plurality of parameters associated with the device; automatically generating, by the processor, an API call based on a comparison of the set of controls to the plurality of parameters; dynamically generating, by the processor, a plurality of virtual card numbers based on a generated API call associated with the set of controls established by the primary user; and automatically generating, by the processor, a provision utilizing the virtual card number to perform a particular action associated with the device.

In some embodiments, the present disclosure provides a technically-improved computer-based system that includes a processor capable of instructing at least the following steps: receive a permission from a primary user of a plurality of users to utilize a particular service associated with a device, identify a predetermined plurality of authentication rules associated with the account of the primary user; determine a plurality of parameters associated with the device at a particular time period, dynamically compare a set of controls associated with a current utilization of the service of the device to the plurality of parameters associated with the device; automatically generate an API call based on a comparison of the set of controls to the plurality of parameters; dynamically generate a plurality of virtual card numbers based on a generated API call associated with the set of controls established by the primary user; and automatically generate a provision utilizing the virtual card number to perform a particular action associated with the device.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
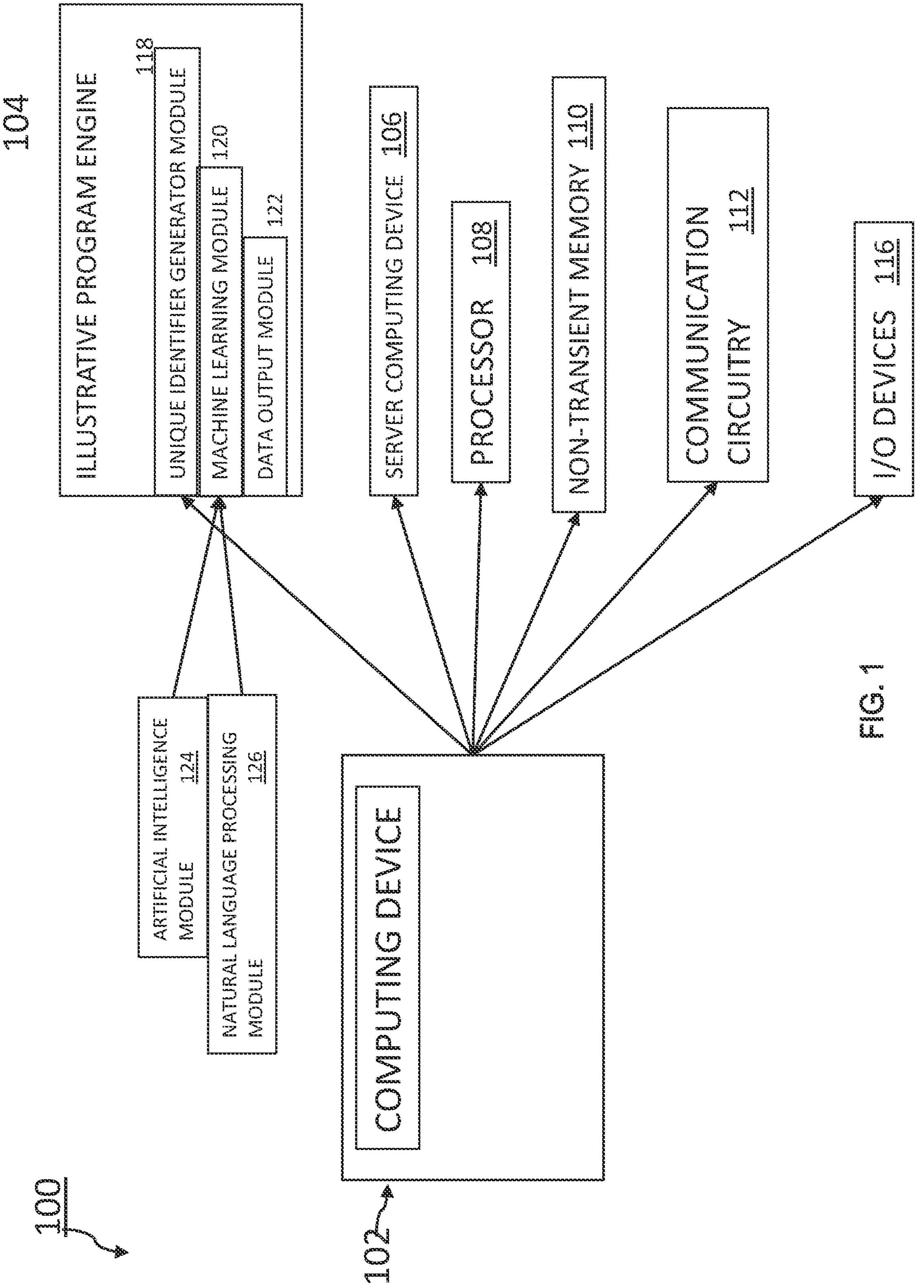
FIG. 1 depicts a block diagram of an exemplary computer-based system and platform for dynamically generating a unique schema-specific identifier based on a generated API call, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of “a,” “an,” and “the” include plural references. The meaning of “in” includes “in” and “on.”

As used herein, the terms “and” and “or” may be used interchangeably to refer to a set of items in both the conjunctive and disjunctive in order to encompass the full description of combinations and alternatives of the items. By way of example, a set of items may be listed with the disjunctive “or”, or with the conjunction “and.” In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term “real-time” is directed to an event/action that can occur instantaneously or almost instantaneously in time when another event/action has occurred. For example, the “real-time processing,” “real-time computation,” and “real-time execution” all pertain to the performance of a computation during the actual time that the related physical process (e.g., a creator interacting with an application on a mobile device) occurs, in order that results of the computation can be used in guiding the physical process.

As used herein, the term “dynamically” and term “automatically,” and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term “runtime” corresponds to any behavior that is dynamically determined during an execution of a software application or at least a portion of software application.

At least some embodiments of the present disclosure provide technological solution(s) to at least one technological computer-centered problem associated with allowing authorized users access to funds associated with an account of a particular user associated with a virtual credit card. Typically, the technological computer-centered problem arises when the particular user grants permission to an authorized user to use a virtual credit card and the authorized user exceeds a predetermined amount of usage with the virtual credit card, where the authorized user is not required to pay the amount associated with the credit account of the particular user. In other instances, the technological computer-centered problem may also arise when the authorized user attempts to utilize the virtual credit card outside of a predetermined time or area, requiring the particular user to respond to a generated notification alerting the particular user of the attempted use. These technological computer-centered problems may decrease customer experience, require an account of the particular user to exceed a credit limit, or allow for fraudulent transactions occurring with the virtual credit card. As detailed in at least some embodiments herein, at least one technological computer-centered solution addressing the technological computer-centered problem may be to dynamically generate a plurality of unique schema-specific identifiers based on a generated application programming interface (“API”) call associated with a set of controls set by the primary user. In some embodiments, the present disclosure may detail at least one practical solution may be to automatically generate the API call based on a comparison of the set of controls to a plurality of parameters associated with a device of the particular user, where the plurality of parameters include an identity of the user utilizing a service, a location of the device, and a type of an action associated with the user utilizing the service. In some embodiments, the present disclosure may automatically generate a provision utilizing the unique schema-specific identifier to perform a particular action associated with device of the particular user.

FIG. 1 depicts a block diagram of an exemplary computer-based system and platform for dynamically generating a unique schema-specific identifier based on a generated API call, in accordance with one or more embodiments of the present disclosure.

In some embodiments, an illustrative computing system 100 of the present disclosure may include at least one computing device 102 associated with at least one user and an illustrative program engine 104. In some embodiments, the illustrative program engine 104 may be stored on the computing device 102. In some embodiments, the illustrative program engine 104 may be executed stored on the computing device 102, which may include a or a server computing device 106, a processor 108, a non-transient computer memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one communicative computing device of a plurality of communicative computing devices. In certain embodiments, the server computing device 106 may be an external data source that is considered hardware. In some embodiments, the server computing device 106 may consist of a plurality of software engines to preform actions. In some embodiments, the computing device 102 may be considered the server computing device 106. For example, the computing device 102 is a digital credit card, a smart credit card, a smart phone, and/or a laptop. In some instances, the computing device 102 may be the at least one smart credit card with an ability to execute a plurality of actions. In certain embodiments, the computing device 102 may refer to a virtual credit card that maintains a plurality of virtual card numbers that authenticate the plurality of actions.

In some embodiments, the illustrative program engine 104 may be configured to instruct the processor 108 to execute one or more software modules such as, without limitation, an exemplary unique identifier generator module 118, a machine learning module 120, and/or a data output module 122.

In some embodiments, an exemplary unique identifier generator module 118 of the present disclosure may utilize at least one trained machine learning module 120, described herein, to automatically generate a provision utilizing the unique schema-specific identifier to perform the particular action associated with the computing device 102. The provision may refer to a dynamic authentication to perform the particular action based on the controls of the particular user. The unique schema-specific identifier may refer to a plurality of virtual card numbers (“VCNs”) generated by the exemplary unique identifier generator module 118. The particular action may refer to a transfer of data from the account associated with the particular user to an external data source. For example, the particular action may refer to a financial transaction utilizing the unique schema-specific identifier by the user (i.e., an authorized user) associated with the account of the particular user. In some embodiments, the exemplary unique identifier generator module 118 may receive a permission from the user of a plurality of users to utilize a particular service associated with the computing device. In certain embodiments, a primary user (i.e., a particular user) may provide the permission to the computing device 102 that allows other users of the plurality of users to utilize the particular service. In certain embodiments, the particular service may refer to an authentication of a transfer of data between the account associated with the primary user and the computing device 102. In some embodiments, the exemplary unique identifier generator module 118 may identify a predetermined plurality of authentication rules associated with the account of the particular user. These authentication rules may refer to a number of rules required for an authorized user to utilize the account associated with the primary user. For example, the authentication rules and preferences may be user imposed restrictions for authorized users, financial institution restrictions imposed on the account of the user, and a combination of the two. In some embodiments, there in a single authentication rule and a single preference associated with the utilization of the account. In some embodiments, the exemplary unique identifier generator module 118 may determine a plurality of parameters associated with the computing device 102 at a particular time period. In certain embodiments, the plurality of parameters may include an identity of the authorized user utilizing the service, a location of the computing device 102, and a type of action associated with the authorized user utilizing the service. In some embodiments, the exemplary unique identifier generator module 118 may dynamically compare a set of controls associated with a current utilization of the service of the computing device 102 to the plurality of parameters. In certain embodiments, the set of controls may refer to an updated set of parameters based on use over time by authorized users and the primary user. In some embodiments, the exemplary unique identifier generator module 118 may automatically generate an application programming interface call based on a comparison of the set of controls to the plurality of parameters. In certain embodiments, the API call may refer to a generated interaction between the computing device 102 and a financial institution associated with the digital card to verify the comparison between the set of controls and the plurality of parameters. In some embodiments, the exemplary unique identifier generator module 118 may dynamically generate a plurality of unique schema-specific identifiers based on the generated API call associated with the set of controls established by the primary user. In certain embodiments, the unique schema-specific identifier serves as an additional authentication to a performance of an action by the authorized user. In some embodiments, the exemplary unique identifier generator module 118 may utilize an artificial intelligence module 124 to predict a plurality of trends associated with the performance of the action and the provision based on a behavior pattern associated with the authorized user and/or the primary user. In some embodiments, the exemplary unique identifier generator module 118 may utilize a natural language processing module 126 to generate a notification detailing the provision associated with the unique schema-specific identifier in relation to the performance of the action.

In some embodiments, the present disclosure describes systems for utilizing the machine learning module 120 that may determine the plurality of parameters associated with the computing device 102 at the particular time period, where the plurality of parameters include an identity of the authorized user utilizing the service, a location of the computing device 102, and a type of an action associated with the authorized user utilizing the service. In some embodiments, the machine learning module 120 may dynamically compare a set of controls associated with a current utilization of the service of the computing device 102 to the plurality of parameters associated with the computing device 102. In some embodiments, the machine learning module 120 may automatically generate an API call based on a comparison of the set of controls to the plurality of parameters. In some embodiments, the machine learning module 120 may dynamically generate a plurality of unique schema-specific identifiers based on a generated API call associated with the set of controls set by the primary user. In some embodiments, the machine learning module 120 may automatically generate a provision utilizing the unique schema-specific identifiers to perform the particular action associated with the computing device 102. In some embodiments, the machine learning module 120 may utilize an artificial intelligence module 124 to predict a plurality of trends associated with the performance of the action and the provision based on a behavior pattern associated with the authorized user and/or the primary user. In some embodiments, the machine learning module 120 may utilize a natural language processing module 126 to generate a notification detailing the provision associated with the unique schema-specific identifiers in relation to the performance of the action.

In some embodiments, the data output module 122 may output the permission from the primary user to utilize the particular service associated with the computing device 102. In some embodiments, the data output module 122 may output the predetermined plurality of authentication rules associated with the account of the primary user. In some embodiments, the data output module 122 may output the plurality of parameters associated with the computing device 102 at the particular time period. In some embodiments, the data output module 122 may output the set of controls associated with the current utilization of the service of the computing device 102 to the plurality of parameters. In some embodiments, the data output module 122 may output the API call based on the comparison of the set of controls to the plurality of parameters. In some embodiments, the data output module 122 may output the plurality of unique schema-specific identifiers based on the generated API call associated with the set of controls established by the primary user. In some embodiments, the data output module 122 may output the provision utilizing the unique schema-specific identifiers to perform the particular action associated with the computing device 102.

In some embodiments, the illustrative program engine 104 may receive the permission from a user of a plurality of users to utilize a particular service associated with the computing device 102, where a primary user provides a permission to the computing device 102 provides a permission that allows an authorized user to utilize the particular service and the particular service may refer to an automatic authentication of a data transfer between the account of the primary user and the external data source. In some embodiments, the illustrative program engine 104 may identify a predetermined plurality of authentication rules associated with the account of the primary user. In some embodiments, the illustrative program engine 104 may determine a plurality of parameters associated with the computing device 102 at a particular time period, where the plurality of parameters may include an identity of the user utilizing the service, the location of the computing device 102, and the type of the action associated with the user utilizing the service. In some embodiments, the illustrative program engine 104 may dynamically compare the set of controls associated with the current utilization of the service of the computing device 102 to the plurality of parameters. In some embodiments, the illustrative program engine 104 may automatically generate the API call based on a comparison of the set of controls to the plurality of parameters. In some embodiments, the illustrative program engine 104 may dynamically generate the plurality of unique schema-specific identifiers based on the generated API call associated with the set of controls established by the primary user. In some embodiments, the illustrative program engine 104 may automatically generate a provision utilizing the unique schema-specific identifiers to perform the particular action associated with the computing device 102.

In some embodiments, the non-transient computer memory 110 may store an output of the permission from the primary user to utilize a particular service associated with the computing device 102. In some embodiments, the non-transient computer memory 110 may store an output of the predetermined plurality of parameters associated with the account of the primary user. In some embodiments, the non-transient computer memory 110 may store an output the plurality of parameters associated with the computing device 102 at a particular period of time. In some embodiments, the non-transient computer memory 110 may store an output of the set of control associated with a current utilization of the service of the computing device compared to the plurality of parameters associated with the account of the primary user. In some embodiments, the non-transient computer memory 110 may store an output the generated API call based on the comparison of the set of controls to the plurality of parameters. In some embodiments, the non-transient computer memory 110 may store an output the plurality of unique schema-specific identifiers based on the generated API call associated with the set of controls established by the primary user. In some embodiments, the non-transient computer memory 110 may store an output the provision utilizing the unique schema-specific identifiers to perform the particular action associated with the computing device 102.

Figure 2:
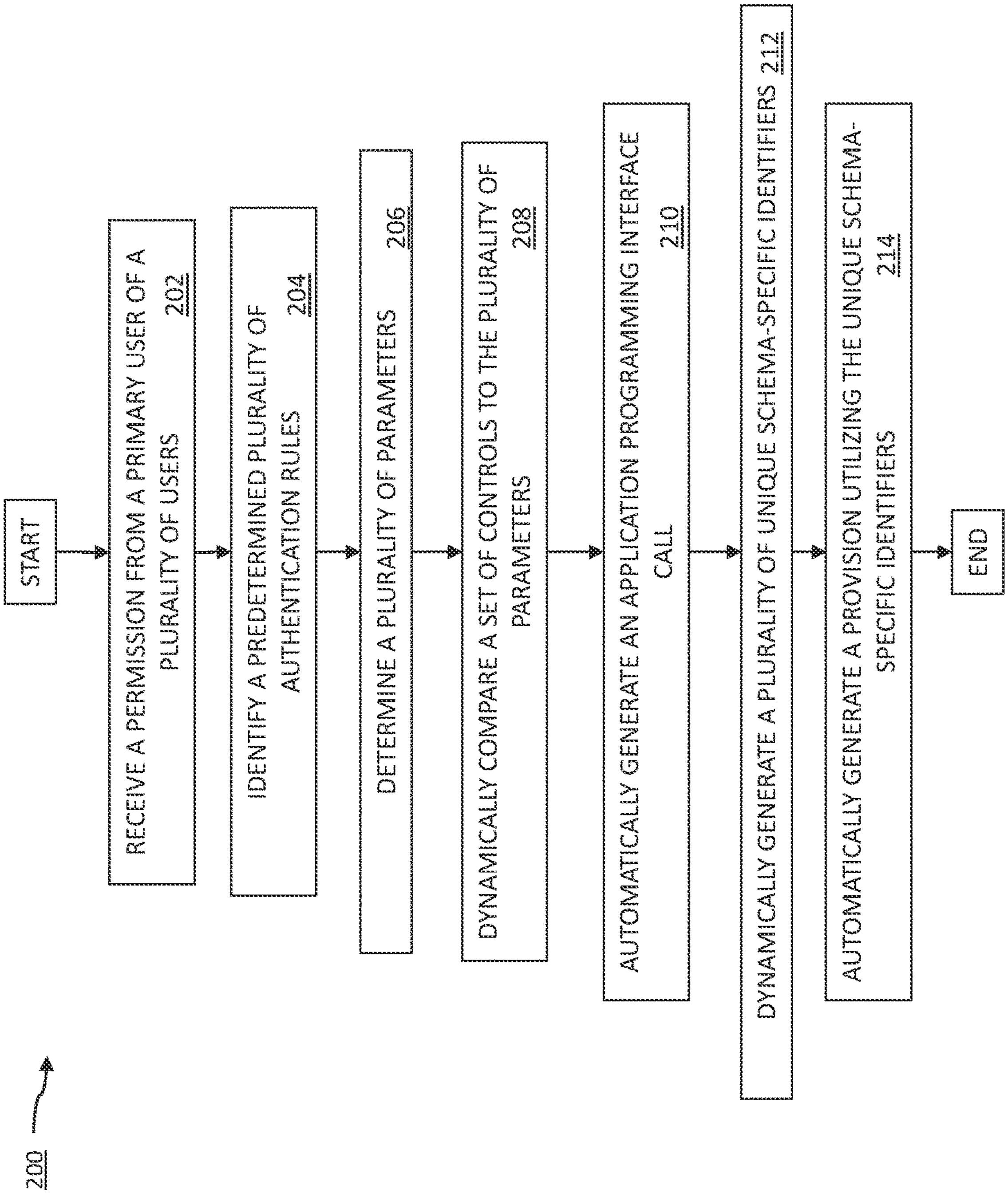
FIG. 2 is a flowchart diagram illustrating operational steps for dynamically generating a unique schema-specific identifier based on a generated API call, in accordance with one or more embodiments of the present disclosure.

FIG. 2 is a flowchart 200 illustrating operational steps for dynamically generating a virtual card number based on a generated API call, in accordance with one or more embodiments of the present disclosure.

In step 202, the illustrative program engine 104 within the computing device 102 may receive a permission from a user of a plurality of users. In some embodiments, the illustrative program engine 104 may receive the permission from a primary user of the plurality of users to utilize a particular service associated with the computing device 102. In some embodiments, the primary user may provide the permission to the computing device 102 to allow other users of the plurality of users to utilize the particular service. In certain embodiments, the particular service may refer to an automatic authentication of a transfer of data between the account of the primary user and an external data source. In some embodiments, the external data source may refer to the server computing device 106. In some embodiments, the exemplary unique identifier generator module 118 may receive the permission from a primary user of the plurality of users to utilize a particular service associated with the computing device 102.

In step 204, the illustrative program engine 104 may identify a predetermined plurality of authentication rules. In some embodiments, the illustrative program engine 104 may identify the predetermined plurality of authentication rules associated with the account of the primary user. In certain embodiments, the plurality of authentication rules may refer to a plurality of received user preferences associated with account usage of a virtual credit card associated with the account of the primary user. These user preferences may refer to a predetermined area where the virtual card can be utilized by the plurality of users without the presence of the primary user. In other embodiments, the user preferences may refer to a refined list of users identified as authorized user who are allowed to access the account of the primary user from a remote location. In certain embodiments, the illustrative program engine 104 may identify a single authentication rule and a single received user preference associated with a profile of the primary user. In some embodiments, the exemplary unique identifier generator module 118 may identify the predetermined plurality of authentication rules associated with the account of the primary user.

In step 206, the illustrative program engine 104 may determine a plurality of parameters associated with the computing device 102. In some embodiments, the illustrative program engine 104 may determine the plurality of parameters associated with the computing device 102 at a particular time period. In certain embodiments, the plurality of parameters associated with the computing device 102 may refer to an identity of the user utilizing the service, a location of the computing device 102, and a type of action attempted to be performed by the user utilizing the service. In certain embodiments, the particular time period may refer to a received user preference associated with the primary user that details an automatic authentication step allowing the utilization of the virtual card by an identified authorized user. In some embodiments, the exemplary unique identifier generator module 118 may determine the plurality of parameters associated with the computing device 102 at the particular time period.

In step 208, the illustrative program engine 104 may dynamically compare a set of controls. In some embodiments, the illustrative program engine 104 may dynamically compare the set of controls associated with a current utilization of the service of the computing device 102 to the plurality of parameters associated with the account of the primary user. In some embodiments, the set of controls may refer to additional and/or subsequent user preferences associated with the primary users that stipulate access to the virtual card, where as these preferences may include spending limit, access to certain items, goods and/or services, and/or location of access to the virtual card. For example, the set of controls may prevent access to alcohol or tobacco products, prevent movie ticket purchase, or require the utilization of the service at grocery stores within a designated area. In certain embodiments, the illustrative program engine 104 may utilize the trained machine learning module 120 to dynamically compare the set of controls associated with a current utilization of the service of the computing device 102 to the plurality of parameters associated with the account of the primary user. In some embodiments, the exemplary unique identifier generator module 118 may dynamically compare the set of controls associated with a current utilization of the service of the computing device 102 to the plurality of parameters associated with the account of the primary user.

In step 210, the illustrative program engine 104 may automatically generate an application programming interface call. In some embodiments, the illustrative program engine 104 may automatically generate the ("API") call based on the comparison between the set of controls and the plurality of parameters. In certain embodiments, the API call may refer to an interaction between the virtual credit card communicating with the external computing device utilizing a plurality of requests and a plurality of responses These request and responses are based on the set of controls established by the primary user, the plurality of parameters associated with the authorized user and the computing device 102; and the particular time period of the utilization of the service associated with the computing device 102. In some embodiments, the exemplary unique identifier generator module 118 may automatically generate the ("API") call based on the comparison between the set of controls and the plurality of parameters.

In step 212, the illustrative program engine 104 may dynamically generate a plurality of unique schema-specific identifiers. In some embodiments, the illustrative program engine 104 may dynamically generate the unique schema-specific identifiers based on the generated API call. In some embodiments, the generated unique schema-specific identifiers that are based on the generated API call may refer to a plurality of virtual hash values that may utilized to automatically authenticate a transaction associated with the service initiated by the authorized user. In certain embodiments, the unique schema-specific identifiers may refer to a plurality of virtual hard numbers associated with the plurality of virtual hash values. These plurality of virtual hash values may be unique and specific to the account of the primary user that may also include a unique salt value to further distinguish the plurality of virtual hash values associated with the account of the primary user from other virtual hash values associated with external accounts of the plurality of users. In some embodiments, the illustrative program engine 104 may dynamically generate the unique schema-specific identifiers based on the generated API call associated with the set of controls established by the primary user. In some embodiments, the exemplary unique identifier generator module 118 may dynamically generate the unique schema-specific identifiers based on the generated API call associated with the set of controls established by the primary user.

In step 214, the illustrative program engine 104 may automatically generate a provision utilizing the unique schema-specific identifiers. In some embodiments, the illustrative program engine 104 may automatically generate the provision utilizing the unique schema-specific identifiers to perform a particular action associated with the computing device 102. In certain embodiments, the provision may refer to a plurality of instructions that can be transmitted from the computing device 102 to the external computing device to detail the subsequent performance of the action. In certain embodiments, the particular action may refer to an action of a plurality of actions, where the action may refer to the automatic authentication of a data transfer from the account of the primary user to the external computing device. The particular action may refer to a purchase an item or service, without the primary user being present. In some embodiments, the exemplary unique identifier generator module 118 may automatically generate the provision utilizing the unique schema-specific identifiers to perform a particular action associated with the computing device 102.

In some embodiments, the exemplary unique identifier generator module 118 may utilize an artificial intelligence module 124 to predict a plurality of trends associated with the performance of the action and the provision based on a behavior pattern associated with the authorized user and/or the primary user. The plurality of trends may refer to a past behavior associated with previous data transfers associated with the authorized user and the account of the primary user. In some embodiments, the exemplary unique identifier generator module 118 may utilize a natural language processing module 126 to generate a notification detailing the provision associated with the VCNs in relation to the performance of the action. The notification may be displayed on a graphical user interface associated with the computing device 102.

Figure 3:
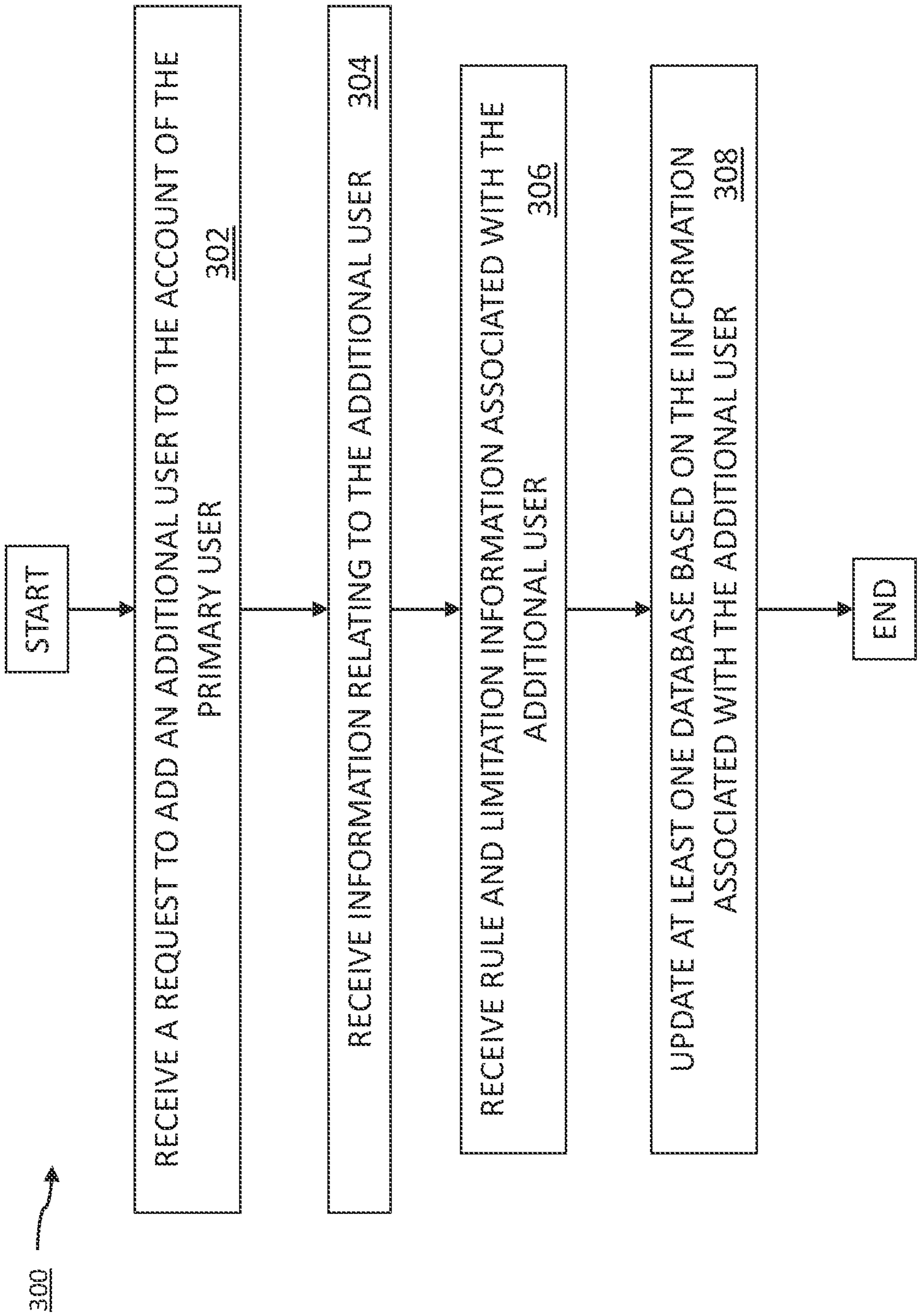
FIG. 3 depicts a flowchart diagram illustrating operational steps for updating a database based on an authorized user and additional information, in accordance with one or more embodiments of the present disclosure.

FIG. 3 depicts a flowchart diagram illustrating operational steps for updating a database based on an authorized user and additional information, in accordance with one or more embodiments of the present disclosure.

In step 302, the illustrative program engine 104 may receive a request to add an additional user to the account of the primary user. In some embodiments, the illustrative program engine 104 may receive the request to add the additional user to the account of the primary user, where the additional user would be considered an additional authorized user of the plurality of users. In some embodiments, the illustrative program engine 104 may receive the request to add the additional user from a first instance of a mobile wallet application deployed to the computing device 102 associated with the primary user. In some embodiments, the exemplary unique identifier generator module 118 may receive the request to add the additional user to the account of the primary user.

In step 304, the illustrative program engine 104 may receive information relating to the additional user. In some embodiments, the information related to the additional user may refer to an identity of the additional user, biological information associated with the additional user, and/or parameters associated with the specific additional user. In some embodiments, the exemplary unique identifier generator module 118 may receive the information relating to the additional user.

In step 306, the illustrative program engine 104 may receive rule and limitation information associated with the additional user. In some embodiments, the rule and limitation information associated with the additional user may refer to additional user preferences transmitted by the primary user associated with the additional authorized user. These rules and limitations may refer to spending limits, locations of permissive actions, and permissive time periods associated with the provision for the additional authorized user. In some embodiments, the exemplary unique identifier generator module 118 may receive the rule and limitation information associated with the additional user.

In step 308, the illustrative program engine 104 may update at least one database based on the information associated with the additional user. In some embodiments, the illustrative program engine 104 may update the at least one database based on the rules and limitation information by generated an electronic message that includes a link structured for the additional authorized user to download on a separate computing device. This separate computing device associated with the additional authorized user may include a second instance of the mobile wallet application. This second instance of the mobile wallet application may gather location data from a Bluetooth device interfacing with the separate computing device associated with the additional authorized user.

Figure 4:
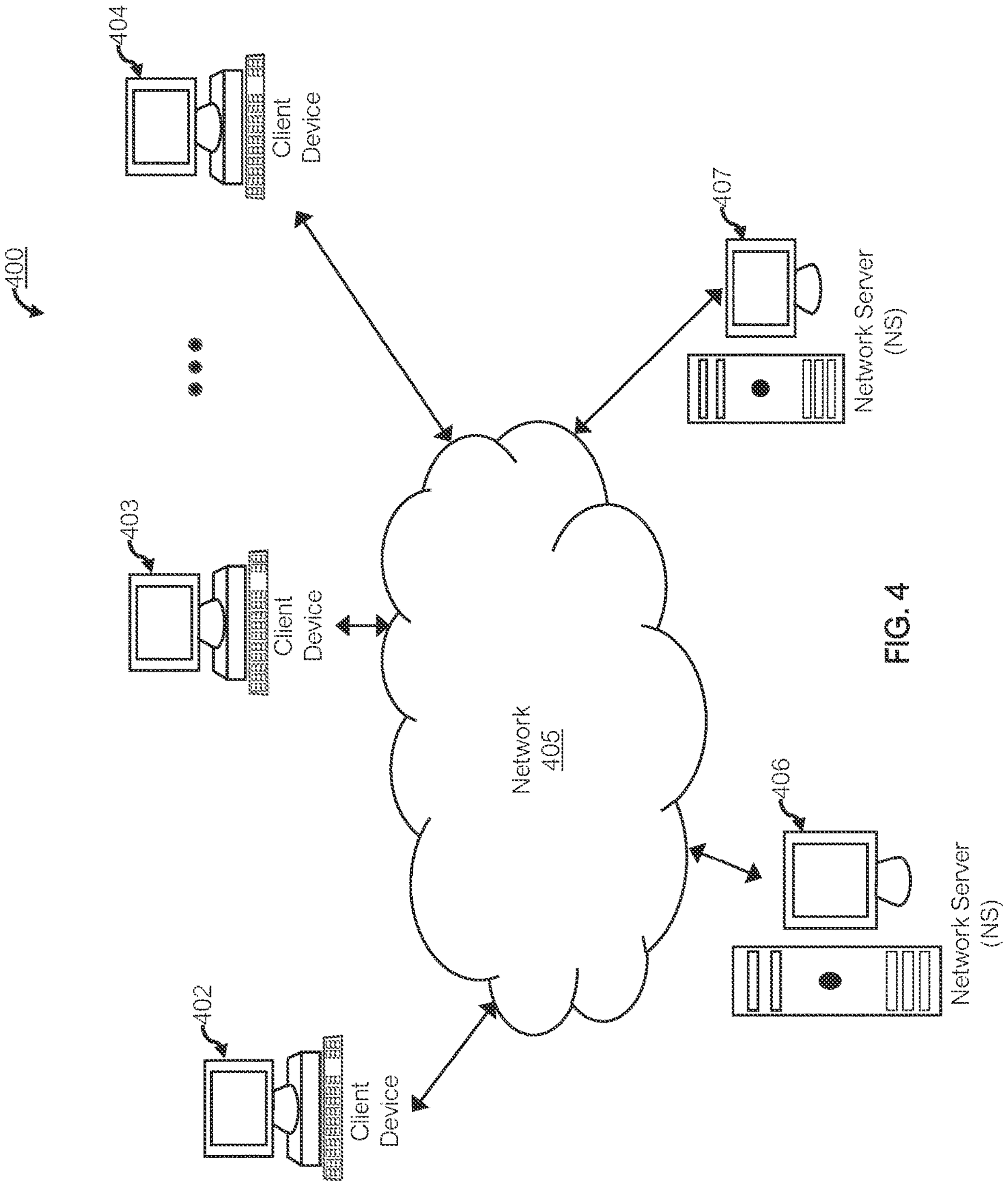
FIG. 4 depicts a block diagram of exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to automatically generate the provision utilizing the unique schema-specific identifiers to perform a particular action associated with the computing device 102, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary unique identifier generator module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of automatically generate a provision utilizing the virtual card number to perform a particular action associated with device of the particular user via a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary unique identifier generator module 118 of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to automatically generate a provision utilizing the virtual card number to perform a particular action associated with device of the particular user; and dynamically generate a plurality of virtual card numbers based on the generated API call associated with the set of controls established by the primary user.

Figure 5:
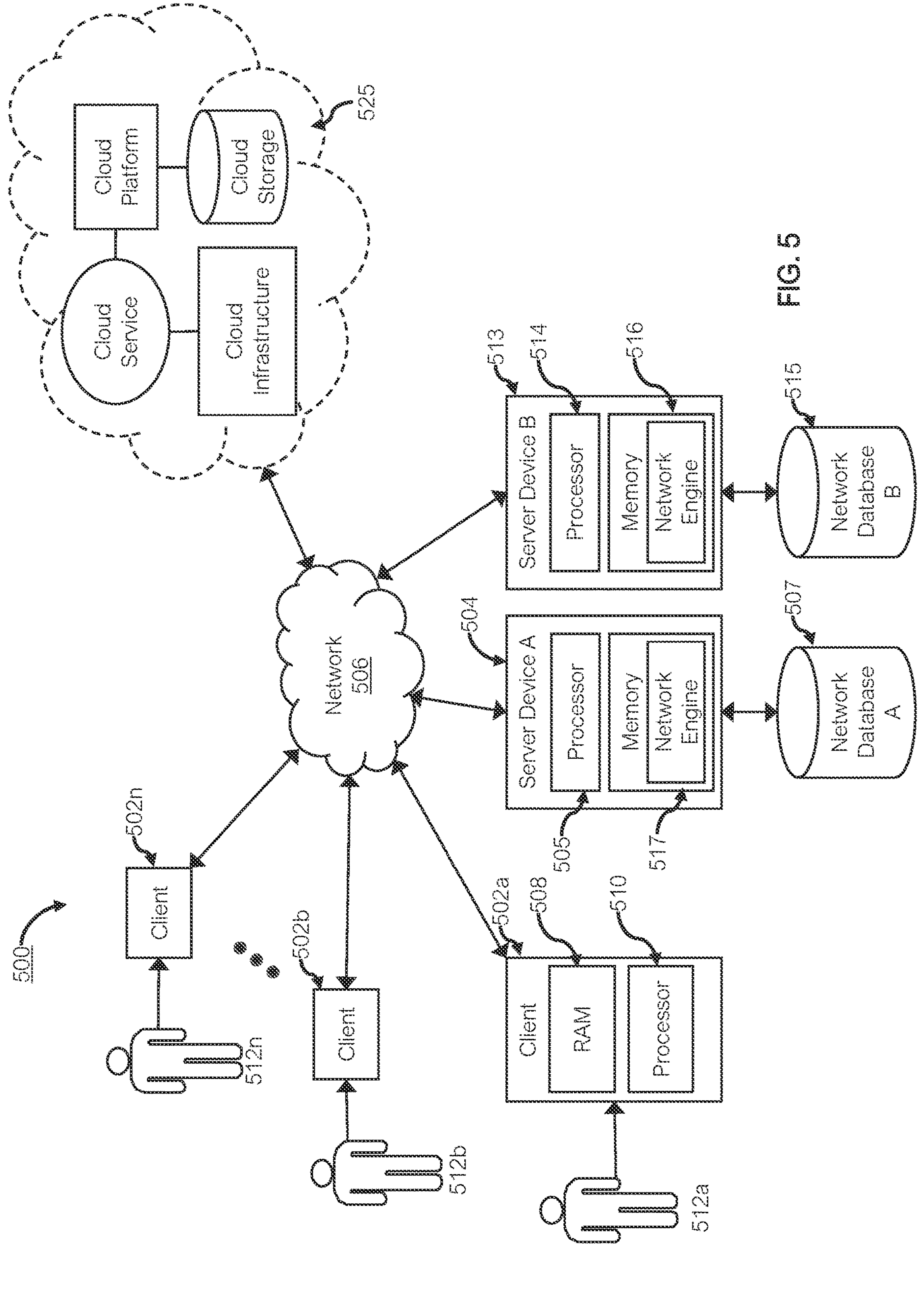
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
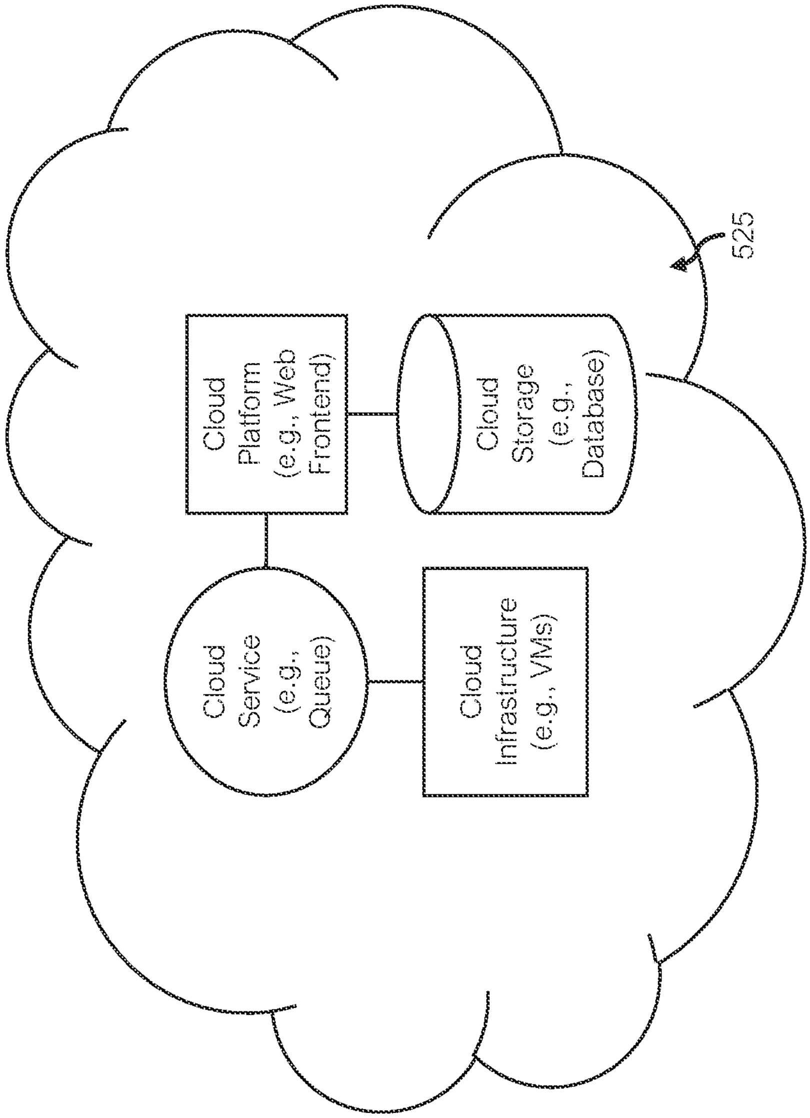
FIGS. 6 and 7 are diagrams illustrating implementations of cloud computing architecture/aspects with respect to which the disclosed technology may be specifically configured to operate, in accordance with one or more embodiments of the present disclosure.
Figure 7:
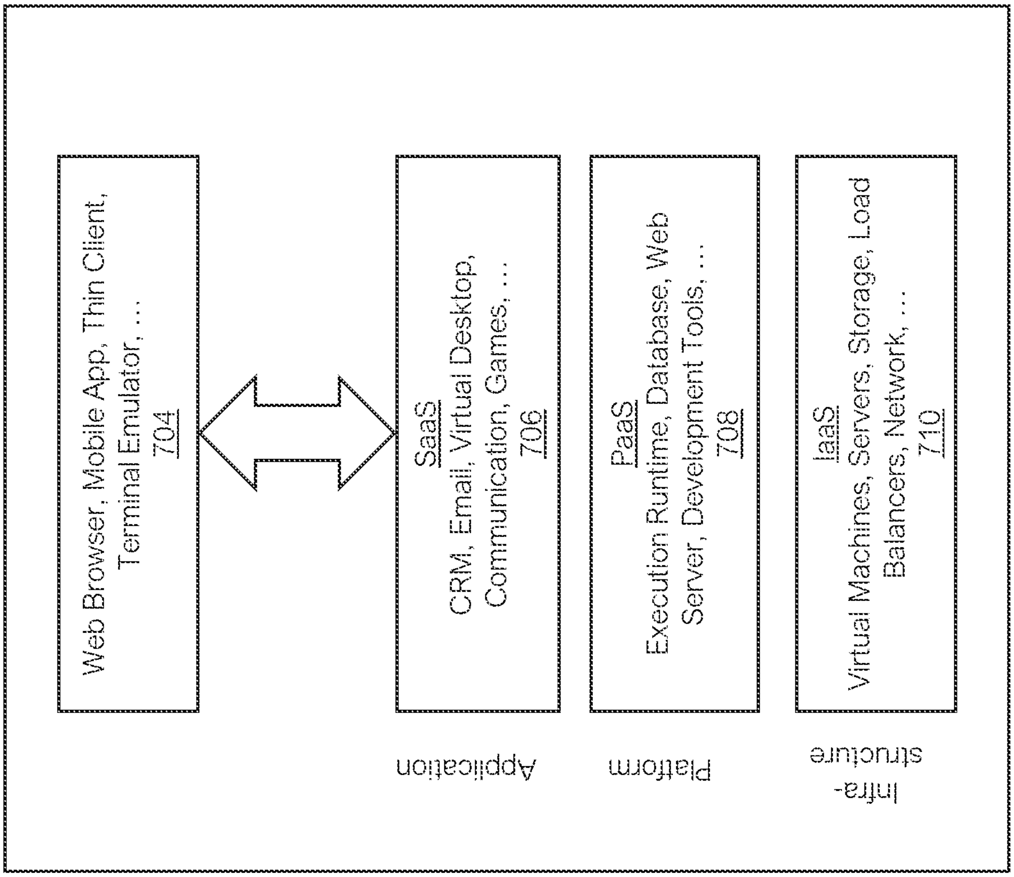

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser, a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A computer-implemented method may include: receiving, by a processor, a permission from a primary user of a plurality of users to utilize a particular service associated with a device, identifying, by the processor, a predetermined plurality of authentication rules associated with a profile of the primary user; determining, by the processor, a plurality of parameters associated with the device at a particular time period, dynamically comparing, by the processor, a set of controls associated with a current utilization of the service of the device to the plurality of parameters associated with the device; automatically generating, by the processor, an API call based on a comparison of the set of controls to the plurality of parameters; dynamically generating, by the processor, a plurality of unique schema-specific identifiers based on a generated API call associated with the set of controls established by the primary user; and automatically generating, by the processor, a provision utilizing the unique schema-specific identifiers to perform a particular action associated with the device.

Clause 2. The method according to clause 1, where a primary user of the plurality users provides a permission to the device that allows other users of the plurality of user to utilize the particular service.

Clause 3. The method according to clause 1 or 2, where the particular service includes an automatic authentication of a transfer of data between an account associated with the primary user and the device.

Clause 4. The method according to clause 1, 2 or 3, where the plurality of parameters include an identity of the user utilizing the service, a location of the device, and a type of action associated with the user utilizing the service.

Clause 5. The method according to clause 1, 2, 3 or 4, where the plurality of authentication rules include a plurality of received user preferences associated with account usage of a virtual credit card associated with the account of the primary user.

Clause 6. The method according to clause 1, 2, 3, 4 or 5, where the plurality of received user preferences include a predetermined area where the virtual card can be utilized by the plurality of users without the presence of the primary user and a refined list of users identified as authorized users that are permitted to access the account of the primary user from a remote location.

Clause 7. The method according to clause 1, 2, 3, 4, 5 or 6, further including establishing the set of controls based on additional user preferences associated with the primary user that stipulate access to the plurality of virtual card numbers.

Clause 8. The method according to clause 1, 2, 3, 4, 5, 6 or 7, where the API call includes an interaction between the device communicating with an external computing device utilizing a plurality of requests and a plurality of responses.

Clause 9. The method according to clause 1, 2, 3, 4, 5, 6, 7, or 8, where each unique schema-specific identifier of the plurality of unique schema-specific identifiers comprises a plurality of virtual card numbers Clause 10. The method according to clause 1, 2, 3, 4, 5, 6, 7, 8 or 9, where the plurality of virtual card numbers include a plurality of virtual hash values that may utilized to automatically authenticate a transaction associated with the service initiated by an authorized user.

Clause 11. The method according to clause 1, 2, 3, 4, 5, 6, 7, 8, 9 or 10, where the provision comprises a plurality of instructions that can be transmitted from the device to an external computing device to detail a subsequent performance of the particular action.

Clause 12. The method according to clause 1, 2, 3, 4, 5, 6, 7, 8, 9, 10 or 11, further including adding an additional authorized user to the plurality of users by: receiving a request to add an additional user to the account of the primary user; receiving information relating to the additional user; receiving rule and limitation information associated with the additional user; and updating at least one database based on the information associated with the additional user.

Clause 13. The method according to clause 1, 2, 3, 4, 5, 6, 7, 8, 9, 10, 11 or 12, further including utilizing an artificial intelligence module to predict a plurality of trends associated with the performance of the particular action and the provision based on a behavior pattern associated with the account of the primary user.

Clause 14. The method according to clause 1, 2, 3, 4, 5, 6, 7, 8, 9, 10, 11, 12 or 13, further including utilizing a natural language processing module to generate a notification detailing the provision associated with the virtual card numbers based on the performance of the particular action.

Clause 15. The method according to clause 1, 2, 3, 4, 5, 6, 7, 8, 9, 10, 11, 12, 13, or 14, where the profile of the primary users includes an account associated with the primary user.

Clause 16. A computer-implemented method may include: receiving, by a processor, a permission from a primary user of a plurality of users to utilize a particular service associated with a device; identifying, by the processor, a predetermined plurality of authentication rules associated with a profile of the primary user; determining, by the processor, a plurality of parameters associated with the device at a particular time period, establishing, by the processor, a set of controls associated with the account of the primary user based on a plurality of user preferences; utilizing, by the processor, a trained machine learning module to dynamically compare the set of controls associated with a current utilization of the service of the device to the plurality of parameters associated with the device; automatically generating, by the processor, an API call based on a comparison of the set of controls to the plurality of parameters; dynamically generating, by the processor, a plurality of unique schema-specific identifiers based on a generated API call associated with the set of controls established by the primary user; automatically generating, by the processor, a provision utilizing the unique schema-specific identifiers to perform a particular action associated with the device; and utilizing, by the processor, an artificial intelligence module to predict a plurality of trends associated with the performance of the particular action and the provision based on a behavior pattern associated with the account of the primary user.

Clause 17. The method according to clause 16, where the particular service includes an automatic authentication of a transfer of data between an account associated with the primary user and the device.

Clause 18. The method according to clause 16 or 17, further including adding an additional authorized user to the plurality of users by: receiving a request to add an additional user to the account of the primary user; receiving information relating to the additional user; receiving rule and limitation information associated with the additional user; and updating at least one database based on the information associated with the additional user.

Clause 19. The method according to clause 16, 17 or 18, where the plurality of authentication rules include a plurality of received user preferences associated with account usage of a virtual credit card associated with the account of the primary user.

Clause 20. A system may include: a non-transient computer memory, storing software instructions; at least one processor of a first computing device associated with a user; where, when the processor executes the software instructions, the first computing device is programmed to: receive a permission from a primary user of a plurality of users to utilize a particular service associated with a device, identify a predetermined plurality of authentication rules associated with a profile of the primary user; determine a plurality of parameters associated with the device at a particular time period, dynamically compare a set of controls associated with a current utilization of the service of the device to the plurality of parameters associated with the device; automatically generate an API call based on a comparison of the set of controls to the plurality of parameters; dynamically generate a plurality of unique schema-specific identifiers based on a generated API call associated with the set of controls established by the primary user; and automatically generate a provision utilizing the unique schema-specific identifiers to perform a particular action associated with the device.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:

receiving, by a processor, a permission from a primary user of a plurality of users to utilize a particular service associated with a device, identifying, by the processor, a predetermined plurality of authentication rules associated with a profile of the primary user;

determining, by the processor, based on the predetermined plurality of authentication rules, a plurality of parameters associated with the device at a particular time period, dynamically comparing, by the processor, a set of controls associated with a current utilization of the service of the device to the plurality of parameters associated with the device;

automatically generating, by the processor, an API call based on a comparison of the set of controls to the plurality of parameters, wherein the API call comprises a generated interaction between the device and an external computing device associated with a particular institution to verify the comparison between the set of controls and the plurality of parameters;

dynamically generating, by the processor, a plurality of unique schema-specific identifiers based on a generated API call associated with the set of controls established by the primary user, wherein each identifier of the plurality of unique schema-specific identifiers comprise a plurality of virtual card numbers; and automatically generating, by the processor, a provision utilizing at least one of the plurality of unique schema-specific identifiers to perform a particular action associated with the device, wherein the provision comprises a plurality of instructions configured to provide details of a subsequent performance of the particular action utilizing at least one of the plurality of virtual card numbers.

2. The method of claim 1, wherein a primary user of the plurality users provides a permission to the device that allows other users of the plurality of user to utilize the particular service.

3. The method of claim 1, wherein the particular service comprises an automatic authentication of a transfer of data between an account associated with the primary user and the device.

4. The method of claim 1, wherein the plurality of parameters comprise an identity of the user utilizing the service, a location of the device, and a type of action associated with the user utilizing the service.

5. The method of claim 1, wherein the plurality of authentication rules comprise a plurality of received user preferences associated with account usage of a virtual credit card associated with an account of the primary user.

6. The method of claim 5, wherein the plurality of received user preferences comprise a predetermined area where the virtual card can be utilized by the plurality of users without the presence of the primary user and a refined list of users identified as authorized users that are permitted to access the account of the primary user from a remote location.

7. The method of claim 1, further comprising establishing the set of controls based on additional user preferences associated with the primary user that stipulate access to a plurality of virtual card numbers.

8. The method of claim 1, wherein the API call comprises an interaction between the device communicating with an external computing device utilizing a plurality of requests and a plurality of responses.

9. The method of claim 1 wherein each unique schema-specific identifier of the plurality of unique schema-specific identifiers comprises a plurality of virtual card numbers.

10. The method of claim 9, wherein the plurality of virtual card numbers comprise a plurality of virtual hash values that may utilized to automatically authenticate a transaction associated with the service initiated by an authorized user.

11. The method of claim 1, wherein the provision comprises a plurality of instructions that can be transmitted from the device to an external computing device to detail a subsequent performance of the particular action.

12. The method of claim 1, further comprising adding an additional authorized user to the plurality of users by:

receiving a request to add an additional user to an account of the primary user;

receiving information relating to the additional user;

receiving rule and limitation information associated with the additional user; and updating at least one database based on the information associated with the additional user.

13. The method of claim 1, further comprising utilizing an artificial intelligence module to predict a plurality of trends associated with the performance of the particular action and the provision based on a behavior pattern associated with an account of the primary user.

14. The method of claim 1, further comprising utilizing a natural language processing module to generate a notification detailing the provision associated with a plurality of virtual card numbers based on the performance of the particular action.

15. The method of claim 1, wherein the profile of the primary users comprises an account associated with the primary user.

16. A computer-implemented method comprising:

receiving, by a processor, a permission from a primary user of a plurality of users to utilize a particular service associated with a device, identifying, by the processor, a predetermined plurality of authentication rules associated with a profile of the primary user;

determining, by the processor, a plurality of parameters associated with the device at a particular time period, establishing, by the processor, a set of controls associated with an account of the primary user based on a plurality of user preferences;

utilizing, by the processor, a trained machine learning module to dynamically compare the set of controls associated with a current utilization of the service of the device to the plurality of parameters associated with the device;

automatically generating, by the processor, an API call based on a comparison of the set of controls to the plurality of parameters, wherein the API call comprises a generated interaction between the device and an external computing device associated with a particular institution to verify the comparison between the set of controls and the plurality of parameters;

dynamically generating, by the processor, a plurality of unique schema-specific identifiers based on a generated API call associated with the set of controls established by the primary user, wherein each identifier of the plurality of unique schema-specific identifiers comprise a plurality of virtual card numbers;

automatically generating, by the processor, a provision utilizing the plurality of unique schema-specific identifiers to perform a particular action associated with the device, wherein the provision comprises a plurality of instructions configured to provide details of a subsequent performance of the particular action utilizing at least one of the plurality of virtual card numbers; and utilizing, by the processor, an artificial intelligence module to predict a plurality of trends associated with the performance of the particular action and the provision based on a behavior pattern associated with the account of the primary user.

17. The method of claim 14, wherein the particular service comprises an automatic authentication of a transfer of data between an account associated with the primary user and the device.

18. The method of claim 14, further comprising adding an additional authorized user to the plurality of users by:

receiving a request to add an additional user to the account of the primary user;

receiving information relating to the additional user;

receiving rule and limitation information associated with the additional user; and updating at least one database based on the information associated with the additional user.

19. The method of claim 14, wherein the plurality of authentication rules comprise a plurality of received user preferences associated with account usage of a virtual credit card associated with the account of the primary user.

20. A system comprises:

a non-transient computer memory, storing software instructions;

at least one processor of a first computing device associated with a user;

wherein, when the processor executes the software instructions, the first computing device is programmed to:

receive a permission from a primary user of a plurality of users to utilize a particular service associated with a device, identify a predetermined plurality of authentication rules associated with a profile of the primary user;

determine a plurality of parameters associated with the device at a particular time period, dynamically compare a set of controls associated with a current utilization of the service of the device to the plurality of parameters associated with the device;

automatically generate an API call based on a comparison of the set of controls to the plurality of parameters, wherein the API call comprises a generated interaction between the device and an external computing device associated with a particular institution to verify the comparison between the set of controls and the plurality of parameters;

dynamically generate a plurality of unique schema-specific identifiers based on a generated API call associated with the set of controls established by the primary user, wherein each identifier of the plurality of unique schema-specific identifiers comprise a plurality of virtual card numbers; and automatically generate a provision utilizing the plurality of unique schema-specific identifiers to perform a particular action associated with the device, wherein the provision comprises a plurality of instructions configured to provide details of a subsequent performance of the particular action utilizing at least one of the plurality of virtual card numbers.

* * * * *